United States Patent
O'Neill et al.

(10) Patent No.: US 9,355,636 B1
(45) Date of Patent: May 31, 2016

(54) SELECTIVE SPEECH RECOGNITION SCORING USING ARTICULATORY FEATURES

(71) Applicant: Amazon Technologies, Inc., Reno, NV (US)

(72) Inventors: Jeffrey Cornelius O'Neill, Somerville, MA (US); Jeffrey Paul Lilly, Seattle, WA (US); Thomas Schaaf, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 304 days.

(21) Appl. No.: 14/027,828

(22) Filed: Sep. 16, 2013

(51) Int. Cl.
  *G10L 15/187* (2013.01)
  *G10L 15/14* (2006.01)

(52) U.S. Cl.
  CPC .................... *G10L 15/142* (2013.01)

(58) Field of Classification Search
  CPC .................................... G10L 15/187
  USPC ..................................... 704/9, 10
  See application file for complete search history.

(56) References Cited

U.S. PATENT DOCUMENTS

| | | | |
|---|---|---|---|
| 6,963,837 B1* | 11/2005 | Finke | G10L 15/187 704/240 |
| 7,664,642 B2* | 2/2010 | Espy-Wilson | G10L 15/02 704/254 |
| 7,672,846 B2* | 3/2010 | Washio | G10L 15/22 704/251 |
| 8,457,959 B2* | 6/2013 | Kaiser | G10L 15/24 704/231 |

* cited by examiner

*Primary Examiner* — Susan McFadden
(74) *Attorney, Agent, or Firm* — Knobbe, Martens, Olson & Bear, LLP

(57) ABSTRACT

Features are provided for selectively scoring portions of user utterances based at least on articulatory features of the portions. One or more articulatory features of a portion of a user utterance can be determined. Acoustic models or subsets of individual acoustic model components (e.g., Gaussians or Gaussian mixture models) can be selected based on the articulatory features of the portion. The portion can then be scored using a selected acoustic model or subset of acoustic model components. The process may be repeated for the multiple portions of the utterance, and speech recognition results can be generated from the scored portions.

24 Claims, 5 Drawing Sheets

SELECTIVE SPEECH RECOGNITION SCORING USING ARTICULATORY FEATURES

BACKGROUND

Natural language processing systems include various modules and components for receiving textual input from a user and determining what the user meant. In some implementations, a natural language processing system includes an automatic speech recognition ("ASR") module that receives audio input of a user utterance and generates one or more likely transcriptions of the utterance. Automatic speech recognition modules typically include an acoustic model and a language model. The acoustic model is used to generate hypotheses regarding which subword units (e.g. phonemes or triphones) correspond to an utterance based on the acoustic features of the utterance. The language model is used to determine which of the hypotheses generated using the acoustic model is the most likely transcription of the utterance based on lexical features of the language in which the utterance is spoken.

Automatic speech recognition often uses acoustic models based on Gaussian mixture models ("GMMs"). GMMs are commonly used models of probability density functions for features used in speech recognition. GMMs are used to score portions of utterance audio to determine which subword units were likely uttered. For example, each GMM may be associated with a particular subword unit. Each GMM includes various individual components (Gaussians) associated with the different ways in which the subword unit may be spoken. Some automatic speech recognition systems may use acoustic models with hundreds of thousands of Gaussians in total (e.g., 100,000-200,000 Gaussians). During speech recognition, features are computed from portions of utterance audio and scored against each Gaussian to determine the subword unit to which the portion of audio likely corresponds.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
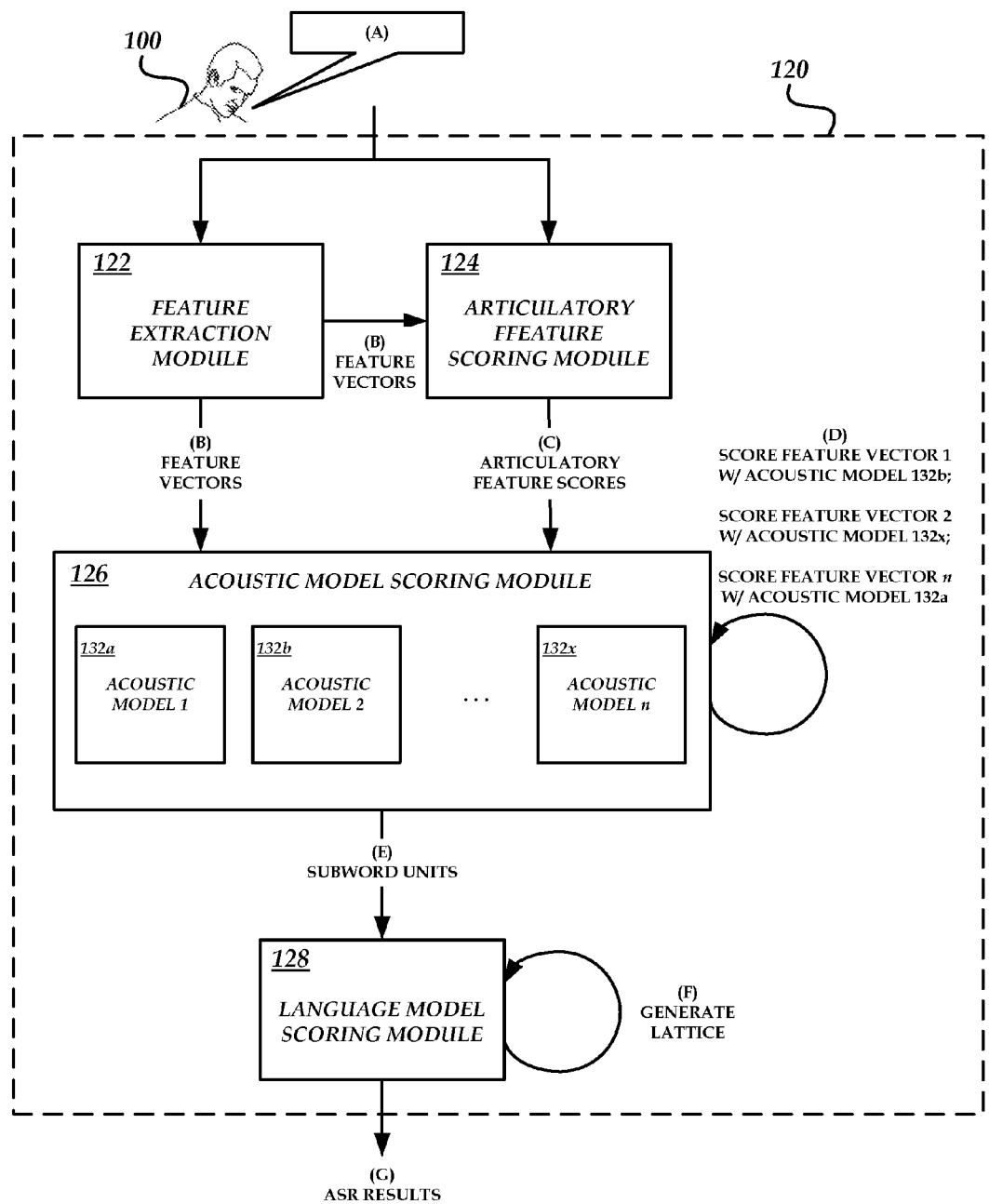
FIG. 1 is a block diagram of illustrative data flows in an automatic speech recognition module for selecting and using a subset of Gaussians for generating automatic speech recognition results.

Many automatic speech recognition ("ASR") systems use acoustic models based on Gaussian mixture models ("GMMs"). In a typical implementation, a single subword unit (e.g., phoneme or triphone) may be modeled as a hidden Markov model ("HMM") with multiple states. Each state of a given HAW may be associated with a particular GMM, and the GMM may include multiple Gaussians. An acoustic model may include more than 100,000 Gaussians in total. During ASR processing, audio of an utterance is separated into a sequence of frames. Each frame may include approximately 10 milliseconds of audio. For each frame of speech, a feature vector containing information about the features of the frame is computed. The feature vector may then be compared with each Gaussian of the acoustic model, in a process that is referred to as "scoring," to determine the likely subword unit to which the frame corresponds. Using Gaussians to score feature vectors is well known to those of skill in the art. Scoring over 100,000 Gaussians for every 10 milliseconds of audio can be time-consuming and resource-intensive, and may introduce latencies and other user-perceived performance degradation that may be unsatisfactory.

Aspects of the present disclosure relate to grouping acoustic model components, such as GMMs or individual Gaussians, into subsets according to articulatory features. Individual frames of utterance audio data are scored using only a particular subset of acoustic model components selected based on the articulatory features of the frames. Grouping GMMs or Gaussians in this manner can substantially reduce the quantity to be scored for any given frame of utterance audio, thereby conserving computing resources and reducing user-perceived latency.

Generally described, articulatory features are properties of a speech sound related to its production in the human vocal tract, e.g., whether a consonant or vowel, the manner of articulation, or place of articulation in the vocal tract, etc. For consonants, articulatory features include manners of articulation (such as whether the sound is voiced, plosive, nasal, a fricative, or an approximant) and places of articulation (such as bilabial, labiodental, dental, palatal, or velar). For vowels, articulatory features include the horizontal position of the tongue (such as front, central, or back) and the vertical position of the tongue (such as closed or open). Each subword unit used in ASR can be classified according an articulatory feature or some combination thereof. Accordingly, each Gaussian used in an acoustic model can be also be classified by articulatory feature, because each Gaussian is associated with a subword unit. By classifying or grouping individual Gaussians according to articulatory features, it is possible to substantially narrow the number of Gaussians against which a particular frame of utterance audio will be scored. The ASR system need only determine the articulatory features of the frame in order to select the proper group of Gaussians against which the score the frame.

The process of grouping Gaussians according to articulatory features is different than conventional hierarchical scoring techniques. Such hierarchical scoring techniques typically involve grouping Gaussians into subsets, and selecting or generating a representative Gaussian to represent the subset. Each frame is scored using the representative Gaussians for the subsets, and the frame is then scored against only the individual Gaussians in the subset associated with the best-scoring representative Gaussian (or n-best scoring representative Gaussians, or all representative Gaussians with scores exceeding a threshold, etc.). In contrast, some aspects of the present disclosure relate to determining articulatory features of frames (or frame sequences) and selecting Gaussians based on those articulatory features rather than scoring each frame against various representative Gaussians. The determination of articulatory features can be both fast and reliable. For example, rather than waiting for a feature vector to be computed for a given frame before it is scored against a representative Gaussian (as is done in hierarchical scoring), some articulatory features may be determined in parallel with computation of a feature vector. This can speed up the process of identifying the proper group of Gaussians against which to score the frame.

Additional aspects of the present disclosure relate to generating acoustic models that focus on particular types of phonemes or other subword units. The Gaussians that are used to generate such acoustic models may be selected based upon the articulatory features associated with the types of phonemes for which the acoustic model will be used. For example, a general acoustic model may be split into two models: one for voiced phonemes, and one for unvoiced phonemes. When frames of utterance audio are classified as voiced or unvoiced, the frames may then be scored using the only the voiced or unvoiced acoustic model, respectively. In some embodiments, acoustic models may be further split based on combinations of two or more articulatory features. For example, if two articulatory features are used, then four acoustic models may be generated. In addition to splitting or otherwise generating multiple acoustic models based on articulatory features, other features may be incorporated. For example, each acoustic model may include Gaussians that would not be included in a general acoustic model, thereby increasing the total number of Gaussians used in an ASR system. The total number of Gaussians may be increased while the number of Gaussians against which each individual frame is scored may remain the same or be reduced in comparison with a general model. As another example, different decision trees, analysis matrices (e.g., linear discriminant analysis ("LDA") or semi-tied covariance ("STC") matrices), and the like may be used in different acoustic models, providing improved performance.

Although aspects of the embodiments described in the disclosure will focus, for the purpose of illustration, on the grouping of Gaussians by articulatory features, one skilled in the art will appreciate that the techniques disclosed herein may be applied to any number of processes or applications performing automatic speech recognition. For example, similar processes or applications may be used to group GMMs or other acoustic model components. Various aspects of the disclosure will now be described with regard to certain examples and embodiments, which are intended to illustrate but not limit the disclosure.

With reference to an illustrative embodiment, FIG. 1 shows example interactions and data flows between various ASR modules in response to receipt of a user utterance. At (A), a user makes an utterance. For example, the utterance may include a spoken command for a computing system to perform some task, a query, a statement to be dictated, etc. The utterance may be provided to an ASR module 120 for processing. In some embodiments, the ASR module 120 may be a stand-alone system for providing speech recognition functionality. In some embodiments, the ASR module 120 may be part of a spoken language processing system. An example spoken language processing system is described in greater detail below with respect to FIG. 2.

Advantageously, the ASR module 120 can perform articulatory feature scoring on the utterance or some portion thereof in order to reduce the number Gaussians against which portions of the utterance are to be scored. The articulatory scoring functionality may be performed in parallel with feature extraction, or articulatory feature scoring may be performed in conjunction with, or subsequent to, feature extraction.

As shown in FIG. 1, utterance audio data of the utterance may be provided to a feature extraction module 122 of the ASR module 120. The feature extraction module 122 can generate feature vectors for frames of audio data. Feature vectors are n-dimensional vectors of numerical features that represent a portion of speech. In speech recognition, a different feature vector may be generated for each 10 millisecond frame of audio data. Typical feature vectors for speech recognition include mel frequency cepstral coefficients ("MFCCs"), perceptual linear prediction ("PLP"), and the like.

The feature vectors generated by the feature extraction module 122 may then be provided at (B) to an acoustic model scoring module 126 for scoring against an acoustic model. In some cases, the feature extraction module 122 can provide the feature vectors, or some portion thereof, to an articulatory feature scoring module 124 in addition to the acoustic model scoring module. The articulatory feature scoring module 124 can score various articulatory features for the frames of audio data, as described below, based at least partly on the feature vectors. In some embodiments, the feature extraction module 122 can provide feature vectors to the articulatory feature scoring module instead of the acoustic model scoring module (e.g., in sequential implementations). In some embodiments, the articulatory feature scoring module 124 may provide information about the articulatory features to the feature extraction module 122. The feature extraction module 122 may compute feature vectors differently depending upon the articulatory features associated with the frames. For example, one type of feature vector may work better for voiced frames and another type of feature vector may work better for unvoiced frames. This may be useful when, e.g., different acoustic models are used for frames associated with different articulatory features.

The articulatory feature scoring module 124 can generate articulatory feature scores for portions of the utterance, and provide the articulatory feature scores to the acoustic model scouring module 126 at (C). For example, the articulatory feature scoring module 124 can score one or more individual articulatory features for a frame or group of frames, and provide the articulatory feature scores to the acoustic model scoring module 126. The articulatory feature scoring module 124 may access data about individual frames of audio or a sequence of frames in order to score the articulatory features. In some embodiments, the articulatory feature scoring module 124 may use the source audio data of the utterance, feature vectors obtained from the feature extraction module 122, or from some combination thereof.

The articulatory feature scoring module 124 may score any number articulatory features for a given frame or group of frames. When scoring multiple articulatory features, the individual articulatory features may be scored sequentially, or they may be scored in parallel in order to reduce total processing time and latency. For example, the articulatory feature scoring module 124 may be configured to generate a score reflecting the probability that a frame of data corresponds to a voiced triphone or other subword unit. Illustratively, the score may be a number between 0-1, 0-100, or some other number reflective of a probability. A lower "voiced" score may indicate that the frame is likely unvoiced, while a higher score may indicate that the frame is likely voiced. The acoustic model scoring module 126 may use the score to determine whether to score the feature vector associated with the frame against Gaussians for voiced subword units, unvoiced subword units, or both voiced and unvoiced subword units, as described in detail below. The articulatory feature scoring module 124 can score additional articulatory features, and provide those scores to the acoustic model scoring module 126.

The acoustic model scoring module 126 may receive feature vectors for frames of audio data to score against one of multiple acoustic models available to the acoustic model scoring module 126. In some embodiments, the acoustic model scoring module 126 may score feature vectors against one of several subsets of Gaussians of a single acoustic model, rather than using multiple separate acoustic models. The acoustic model scoring module 126 may determine which individual acoustic model or Gaussian subset to use based on the articulatory feature scores it has received. In some embodiments, the acoustic model scoring module 126 may use two or more score ranges to make the determination. For example, the acoustic model scoring module 126 may use three score ranges to determine whether to use only Gaussians associated with voiced subword units, only Gaussians associated with unvoiced subword unites, or all Gaussians regardless of whether they are associated with voiced or unvoiced subword units. If the "voiced" articulatory feature score for a particular frame is within a first range or fails to meet a first threshold (e.g., 0.2 on a scale of 0.0-1.0), the acoustic model scoring module 126 may score the feature vector against only the Gaussians for unvoiced subword units, as described in greater detail below. If the "voiced" articulatory feature score is within a second range or exceeds a second threshold (e.g., 0.8 on a scale of 0.0-1.0), the acoustic model scoring module 126 may score the feature vector against only the Gaussians for voiced subword units. If the acoustic model falls between the two thresholds, the acoustic model scoring module 126 may not eliminate any Gaussians based on whether the Gaussians are associated with voiced or unvoiced subword units. A similar process may alternatively or subsequently be used to include and/or exclude Gaussians based on articulatory feature scores for other articulatory features. The process may be used until a desired number or subset of Gaussians has been identified, until a desired number or combination of articulatory features has been considered, etc.

As described above and in greater detail below, the acoustic model scoring module 126 can select from multiple acoustic models 132a-132x based on the articulatory feature scores. For example, there may be x acoustic models, and each acoustic model may be associated with individual articulatory features, or with articulatory feature scores or score ranges. In some embodiments, each acoustic model may be associated with some combination of articulatory features, or some combination of articulatory feature scores or score ranges. As shown in FIG. 1, the acoustic model scoring module 126 may select an acoustic model on a frame-by-frame basis at (D). Illustratively, if a particular combination of articulatory feature scores is obtained for feature vector 1, the acoustic model scoring module 126 may use acoustic model 132b. If different combination of articulatory feature scores or ranges is obtained for feature vector 2, the acoustic model scoring module 126 may use acoustic model 132x. If another combination of articulatory feature scores or ranges is obtained for feature vector n, the acoustic model scoring module may use acoustic model 132a.

The example ranges, thresholds, and articulatory feature combinations described herein are illustrative only, and are not intended to be limiting. In practice, an acoustic model scoring module 126 may use any number of ranges or thresholds, or any combination of articulatory features. In some embodiments, the articulatory feature scoring module 124 or some other module or component may determine the acoustic model or Gaussian subset that is to be used. In such cases, the acoustic model scoring module 126 can receive feature vectors and identifiers of acoustic models or Gaussian subsets to be used for the feature vectors.

The acoustic model scoring module 126 may repeat the process of scoring frames against individual acoustic models or Gaussian subsets until all frames of the utterance or some desired subset thereof have been scored. The scores for the feature vectors can be used to determine which subword units are likely associated with the frames of audio data. The acoustic model scoring module 126 can provide the data regarding the likely subword unites to a language model scoring module 128 at (E).

The language model scoring module 128 can generate a lattice of results at (F), and provide the results to some other module, process, or system at (G).

Spoken Language Processing System Environment

Figure 2:
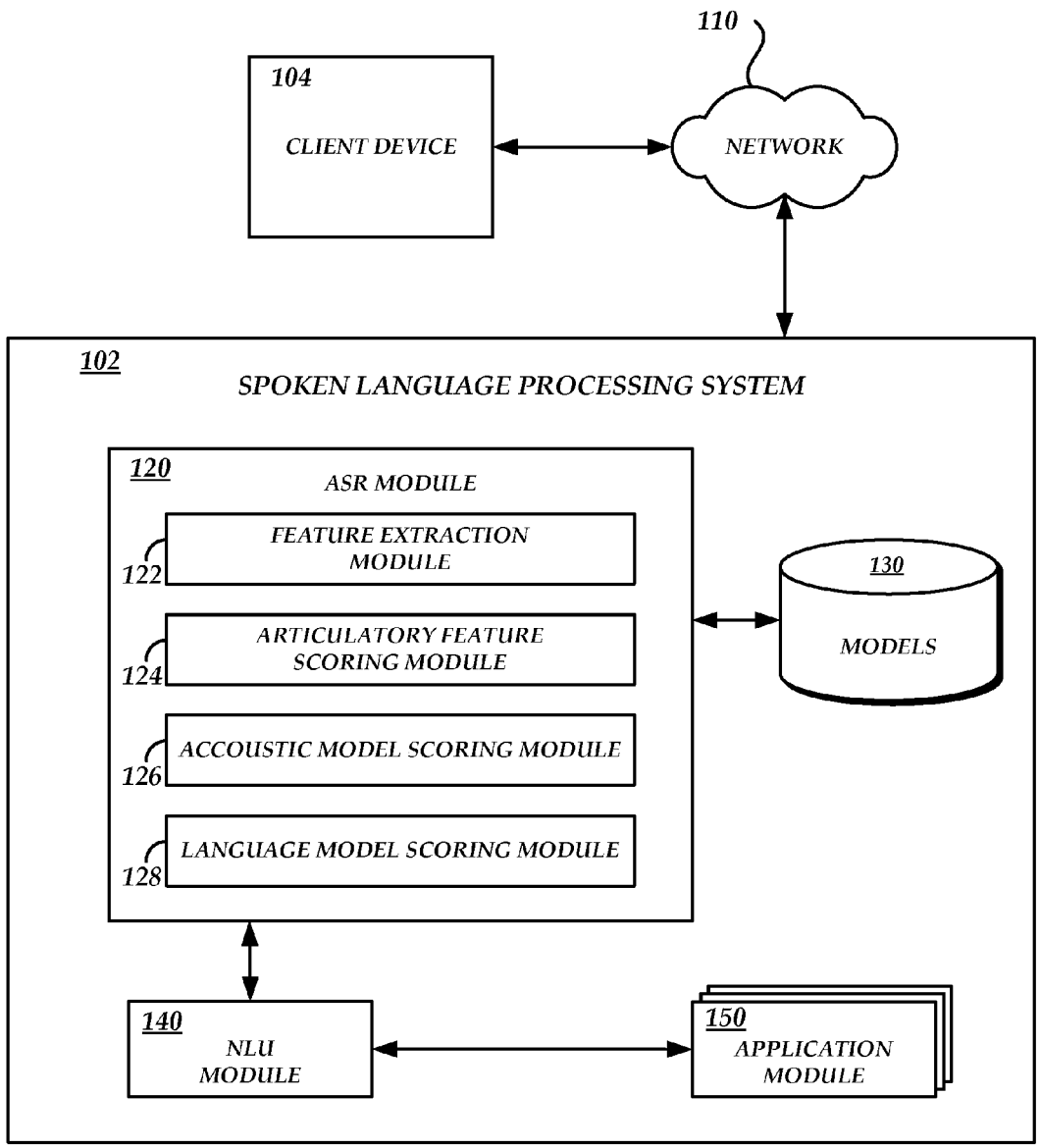
FIG. 2 is a block diagram of an illustrative computing environment in which the features of the present disclosure may be implemented, including a client device and a remote spoken language processing system.

FIG. 2 illustrates an example spoken language processing system 102 and a client device 104. The spoken language processing system 102 can be a network-accessible system in communication with the client device 104 via a communication network 110, such as a cellular telephone network or the Internet. A user may use the client device 104 to submit utterances, receive information, and initiate various processes, either on the client device 104 or at the spoken language processing system 102. For example, the user can issue spoken commands to the client device 104 in order to get directions, listen to music, query a data source, dictate a document or message, or the like.

The client device 104 can correspond to a wide variety of electronic devices. In some embodiments, the client device 104 may be a computing device that includes one or more processors and a memory which may contain software applications executed by the processors. The client device 104 may include a microphone or other audio input component for accepting speech input on which to perform speech recognition. The software of the client device 104 may include components for establishing communications over wireless communication networks or directly with other computing devices. Illustratively, the client device 104 may be a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance.

The spoken language processing system 102 can be any computing system that is configured to communicate via a communication network. For example, the spoken language processing system 102 may include any number of server computing devices, desktop computing devices, mainframe computers, and the like. In some embodiments, the spoken language processing system 102 can include several devices physically or logically grouped together, such as an application server computing device configured to perform speech recognition on an utterance and a database server computing device configured to store records and speech recognition models.

The spoken language processing system 102 can include an ASR module 120, an NLU module 140, one or more application modules 150, and one or more data stores 130. In some embodiments, the spoken language processing system 102 can include various modules and components combined on a single device, multiple instances of a single module or component, etc. For example, the spoken language processing system 102 may include a separate database server that may be configured with a models data store 130; a server or group of servers configured with both ASR and NLU modules 120, 140; and a server or group of servers configured with applications 150. In multi-device implementations, the various devices of the spoken language processing system 102 may communicate via an internal communication network, such as a corporate or university network configured as a local area network ("LAN") or a wide area network ("WAN"). In some cases, the devices of the spoken language processing system 102 may communicate over an external network, such as the Internet, or a combination of internal and external networks.

In some embodiments, the features and services provided by the spoken language processing system 102 may be implemented as web services consumable via a communication network 110. In further embodiments, the spoken language processing system 102 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 110 may be a publicly accessible network of linked networks, possibly operated by various distinct parties, such as the Internet. In other embodiments, the network 110 may include a private network, personal area network ("PAN"), LAN, WAN, cable network, satellite network, etc. or some combination thereof, each with access to and/or from the Internet. For example, the devices of the spoken language processing system 102 may be located within a single data center, and may communicate via a private network as described above. The client device 104 may communicate with spoken language processing system 102 via the Internet. The client device 104 may have access to the Internet via a wired or WiFi connection, or via a cellular telephone network (e.g., a Long Term Evolution or LTE network).

In some embodiments, the ASR module 120, either alone or in combination with other spoken language processing system modules and components, may be physically located on a client device 104. For example, a client device 104 may include an integrated ASR module 120 or spoken language processing system 102 such that no network access is required in order to use some or all of its features. As another example, a portion of ASR processing or other spoken language processing system 102 functionality may implemented on a client device 104, and other spoken language processing system components and features may be accessible via a communication network.

Process for Grouping Gaussians Based on Articulatory Feature

Figure 3:
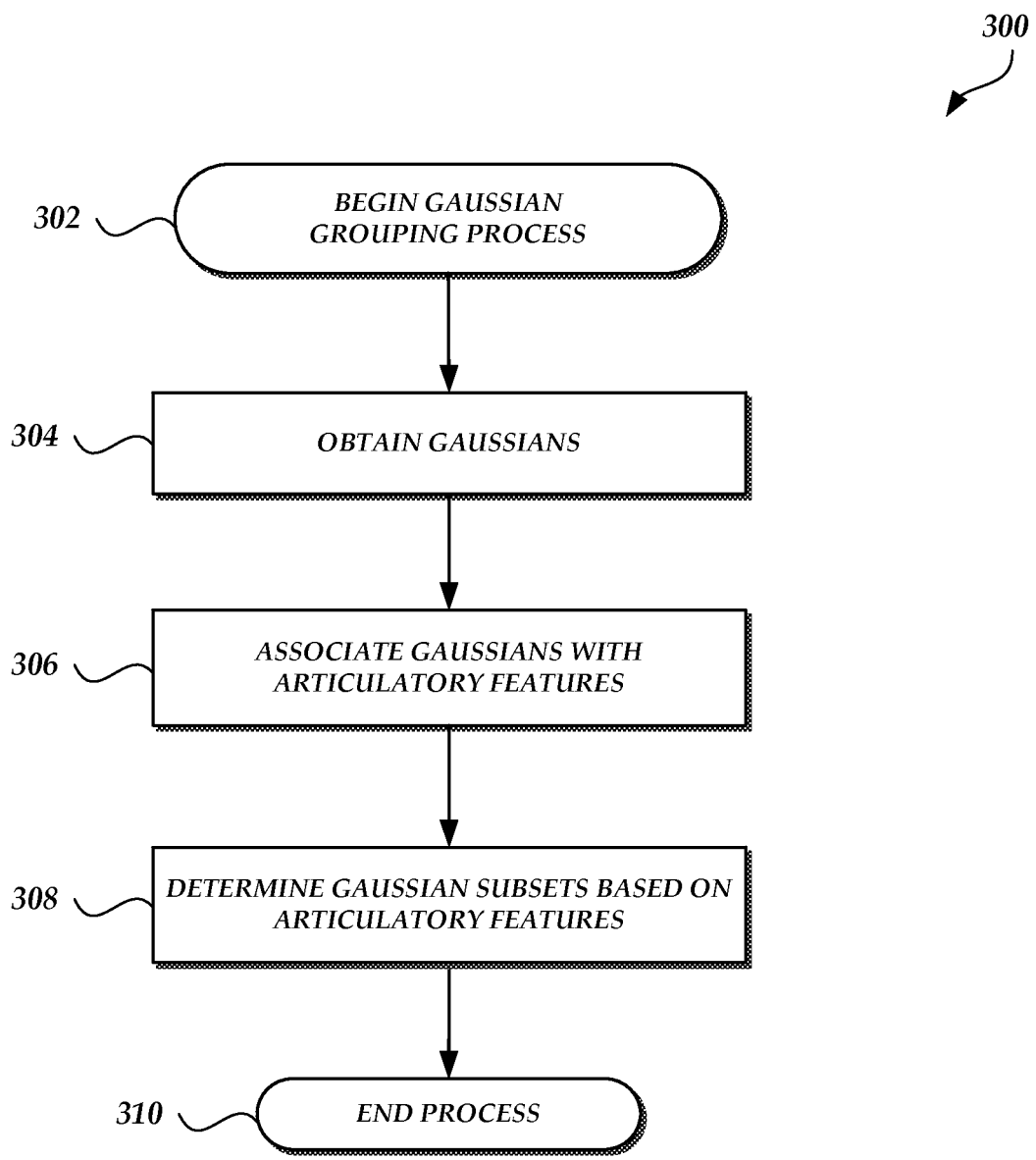
FIG. 3 is a flow diagram of an illustrative process for associating Gaussians with articulatory features.

With reference now to FIG. 3, a sample process 300 for grouping Gaussians according to articulatory features will be described. Advantageously, an ASR module 120 (or some other module or component of a spoken language processing system 102) performing the process 300 can determine subsets of Gaussians, of all of the Gaussians available to the ASR module 120, to be used for scoring frames of audio associated with particular articulatory features or combinations. In some embodiments, separate acoustic models may be generated for one or more of the Gaussian subsets.

The process 300 begins at block 302. The process 300 may be embodied in a set of executable program instructions stored on a computer-readable medium, such as one or more disk drives, of a computing system of the spoken language processing system 102. When the process 300 is initiated, the executable program instructions can be loaded into memory, such as RAM, and executed by one or more processors of the computing system.

At block 304, the ASR module 120 or some other module or component of the spoken language processing system 102 can obtain the Gaussians to be grouped by, or associated with, articulatory features. In general, a large number of Gaussians can provide greater accuracy than a small number of Gaussians, while also increasing scoring latency due to the additional scoring operations performed. As described above, ASR systems use many thousands of Gaussians in order to provide a satisfactory level of accuracy (e.g., 100,000-200,000 Gaussians). The ASR module 120 may use the process 300 to group the Gaussians into subsets, as described in greater detail below. During ASR processing of an utterance, scoring each frame against only a subset of the Gaussians can reduce latency and conserve resources. In some embodiments, the ASR module 120 may obtain substantially more Gaussians to improve accuracy, such that each subset of Gaussians has substantially the same amount of Gaussians as a conventional ASR system has in total.

At block 306, the ASR module 120 or some other module or component of the spoken language processing system 102 can associate the Gaussians with articulatory features. Each Gaussian in an ASR system may be associated with a subword unit, such as a triphone. As described above, each subword unit may be classified according to one or more articulatory features. For example, a particular vowel sound, such as a long "o" sound, is voiced, not plosive, not bilabial, etc. Accordingly, the Gaussians associated with the long "o" sound may be associated with one or more of those articulatory features individually, some combination of articulatory features, a subset of all articulatory features, etc. Associating Gaussians with articulatory features may be accomplished by tagging each Gaussian with metadata reflecting the articulatory features, storing the Gaussians in a data store by articulatory feature, generating an index or some of list of Gaussians and associated articulatory features, etc.

At block 308, the ASR module 120 or some other module or component of the spoken language processing system 102 can determine Gaussian subsets based on articulatory features. The subsets may be based on particular combinations of articulatory features. Returning to the example above, one subset of Gaussians may be defined as those Gaussians which are voiced, not plosive, not bilabial, etc. Any number of Gaussian subsets may be defined. The Gaussians in each subset may be stored together in a data store so that they may be accessed as a group. In some embodiments, all Gaussians used by the ASR module 120 are stored together, and a separate index or listing of groups and component Gaussians is generated and maintained so that the Gaussians of a particular subset may be accessed during speech recognition.

At block 310, the process 300 may terminate.

Instead of the above procedure, the ASR module 120 or some other module or component of the spoken language processing system may generate individual acoustic models for different combinations of articulatory features. For example, one acoustic model could be created for voiced frames and another acoustic model could be created for unvoiced frames. During training of the acoustic models and also during speech recognition using those models, the models would be interleaved corresponding to whether a frame is classified as voices or unvoiced. In some embodiments, different decision trees, analysis matrices (e.g., linear discriminant analysis ("LDA") or semi-tied covariance ("STC") matrices), and the like may be used in different acoustic models, providing improved performance.

Selective Scoring Based on Articulatory Features

Figure 4:
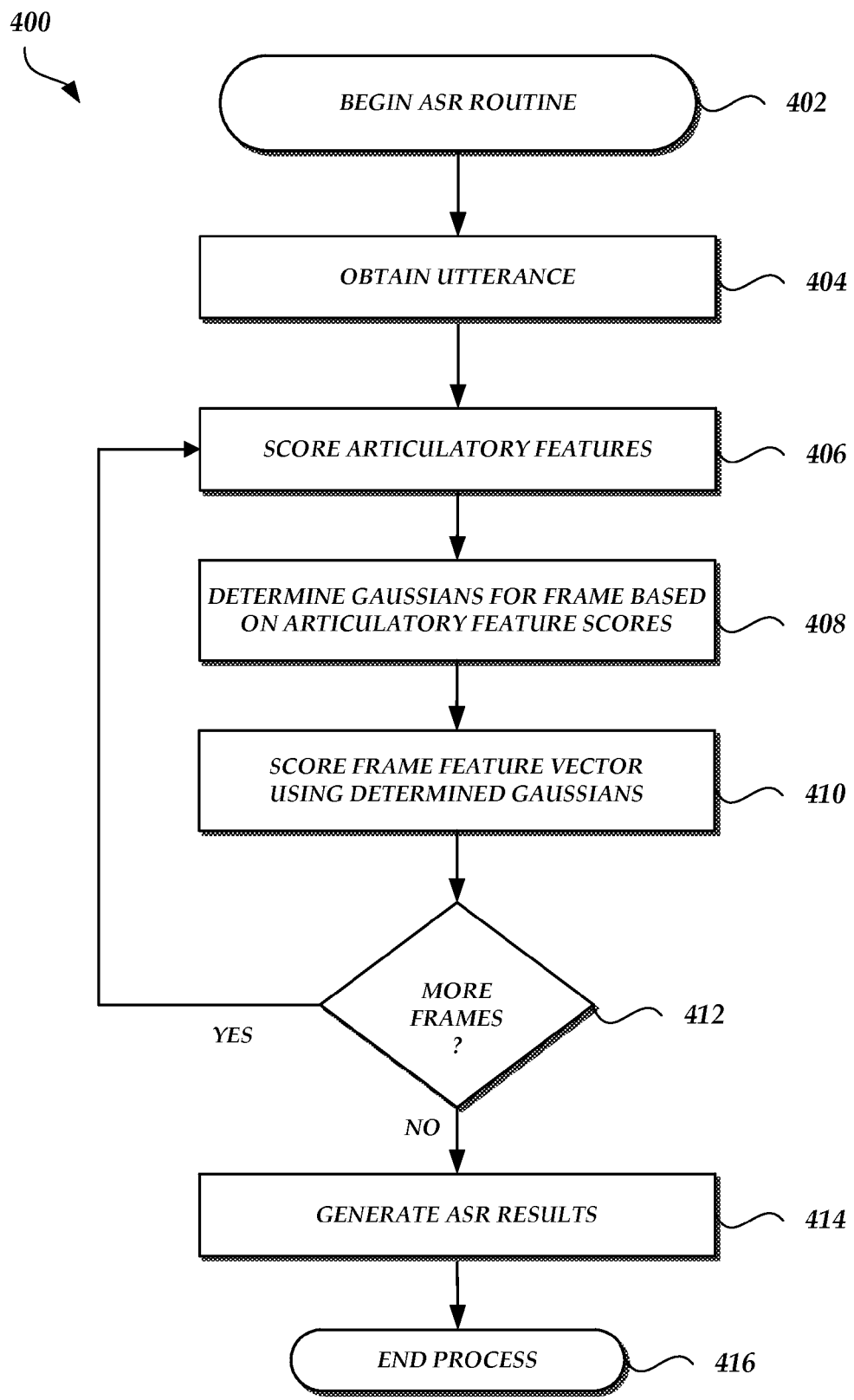
FIG. 4 is a flow diagram of an illustrative process for performing automatic speech recognition using Gaussians selected based on articulatory features.

With reference now to FIG. 4, a sample process 400 for performing automatic speech recognition using selective Gaussian scoring based on articulatory features of the utterance. Advantageously, an ASR module 120 can determine one or more articulatory features for portions of an utterance (e.g., a frame or sequence of frames). The ASR module 120 may therefore reduce the number of Gaussians against which to score a given frame of the utterance audio. In some embodiments, separate acoustic models may be used, depending upon the articulatory features of the frame to be scored.

The process 400 begins at block 402. The process 400 may begin automatically upon receipt of a user utterance, or the process may be initiated by some other process, module, or component. The process 400 may be embodied in a set of executable program instructions stored on a computer-readable medium, such as one or more disk drives, of a computing system of the spoken language processing system 102. When the process 400 is initiated, the executable program instructions can be loaded into memory, such as RAM, and executed by one or more processors of the computing system.

Figure 5:
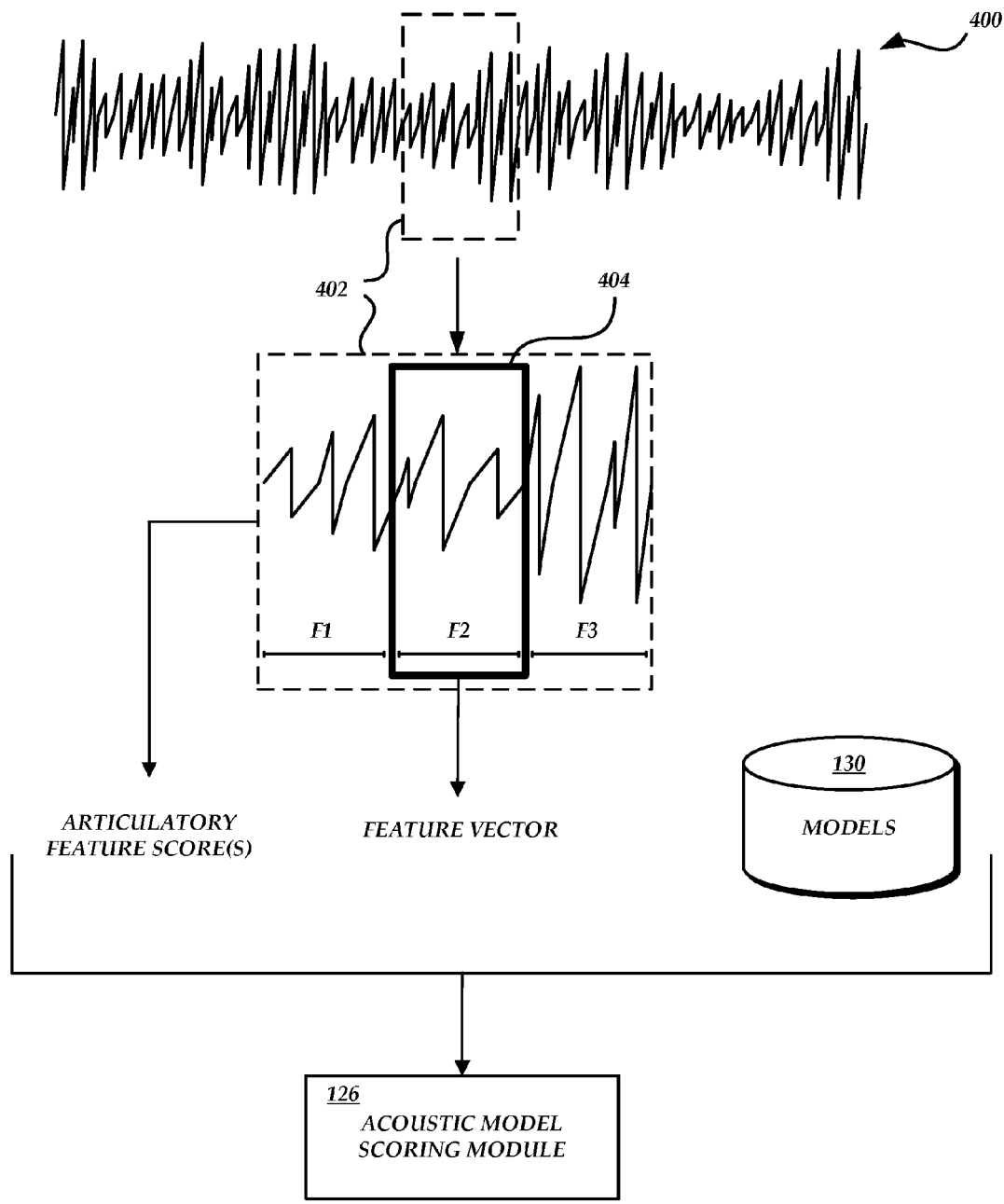
FIG. 5 is a conceptual diagram of audio data processed to identify articulatory features.

At block 404, the ASR module 120 or some other module or component of the spoken language processing system 102 can obtain audio data of a user utterance. The audio data may be obtained in the form of a waveform file or stream, or some other audio file or stream. FIG. 5 shows an example visual representation of a waveform 400. In some embodiments, as shown, the audio data may be separated into frames. Enlarged view 402 shows three frames of audio data, namely F1, F2 and F3. Illustratively, each frame may correspond to about 10 milliseconds of audio. Other frame sizes may be used depending upon the implementation.

At block 406, the articulatory feature scoring module 124 or some other module or component the spoken language processing system 102 can score one or more articulatory features of portions of the utterance. The ASR module 120 may score articulatory features for individual frames or groups of frames. For example, the ASR module 120 may generate a score reflecting the probability or otherwise indicating that a particular frame or sequence of frames is voiced or unvoiced (e.g., that the frame corresponds to a subword unit that is voiced). Using multiple frames to generate the score can be advantageous because, e.g., there may be background noise or other interference with an individual frame. FIG. 5 illustrates the use of multiple frames F1, F2 and F3 to generate one or more articulatory feature scores. Speakers tend to voice sounds for a time period that exceeds one frame, and therefore the voiced/unvoiced characteristics of a given frame tend to be correlated with the voiced/unvoiced characteristics of adjacent frames (e.g., if frame F1 and frame F3 are voiced, it is likely that frame F2 is also voiced). As another example, the ASR module 120 may generate a score indicating that a particular frame or sequence of frames is bilabial or coronal. The score may be based on an analysis of how certain features change over the course of a sequence of frames, such as a change in the measurement of a certain energy over time, the rate at which the measurement increases or decreases, etc. In some embodiments, articulatory features may be scored directly from the audio data, rather than from frames. For example, the ASR module 120 may determine whether a portion of audio is voiced or unvoiced from an analysis of the input audio data, or from some information derived from the input, rather than from individual frames or sequences of frames. For example, to determine whether speech is voiced or unvoiced, parameters may be derived from the audio data, such as zero crossings, energy, auto-correlations, and linear-predictive coefficients.

In some embodiments, scoring articulatory features directly from the audio data or otherwise without using frames can be done in parallel with feature extraction. As shown in FIG. 5, generation of a feature vector for frame F2 may involve execution of a process that is independent of the process for scoring articulatory features for frame F2 (and frames F1 and F3, etc.). In some embodiments, scoring multiple articulatory features may be done in parallel, rather than sequentially. These and other parallel processing techniques may be used, individually or in combination, to reduce user-perceived latency attributable to the scoring of articulatory features.

At block 408, the acoustic model scoring module 126 or some other module or component of the spoken language processing system 102 can determine which Gaussians to use when scoring a current frame. The acoustic model scoring module 126 may do so based on the articulatory feature scores generated above. As described above, Gaussians may be physically grouped by articulatory feature(s) (e.g., stored in a group or as an acoustic model) or logically grouped by articulatory feature(s) (e.g., via an index associating each Gaussian with one or more articulatory features). The appropriate Gaussians may be obtained based on articulatory scores for the current frame. In some embodiments, Gaussians may be selected based on how articulatory feature scores for the current frame correspond to score ranges or thresholds associated with a particular subset of Gaussians, as described in greater detail above. In some embodiments, one of multiple acoustic models may be selected based on articulatory features associated with the acoustic model.

At block 410, the acoustic model scoring module 126 or some other module or component of the spoken language processing system 102 can score the feature vector for the current frame using the Gaussians determined above. If individual acoustic models are used for frames associated with certain articulatory features or combinations thereof, the feature vectors which are scored against the individual acoustic models may be smaller than would otherwise be the case. For example, two separate acoustic models may be used: a first model for a first half of the phonemes of a language, and a second acoustic model for the remaining half of the phonemes, such as one for voiced phonemes and one for unvoiced phonemes. Choosing the correct phoneme from among half of the phonemes of a language may not be as difficult or computationally complex as choosing from among all of the phonemes of a language. Therefore, in certain cases, smaller feature vectors (e.g., feature vectors with fewer features) may be used. When the feature extraction module 122 generates feature vectors for frames of audio data, it may therefore generate smaller feature vectors.

At decision block 412, the ASR module 120 can determine whether there are additional frames of the current utterance to score. If so, the process 400 can return to block 406. Alternatively, the process 400 may return to block 408, such as in implementations where the scoring of the articulatory features is performed in parallel with scoring the feature vectors, rather than sequentially with the scoring of the feature vectors on a frame-by-frame basis. If there are no additional frames of the current utterance to score, the process 400 may proceed to block 414, where ASR results may be generated. For example, as described above, a language model may be used to generate a lattice of results from the scored feature vectors. The process 400 can terminate at block 416

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
   obtain audio data regarding an utterance of a user;
   compute a feature vector for a portion of the audio data;
   determine a first score indicating that the portion of the audio data corresponds to a first articulatory feature;
   determine a second score indicating that the portion of audio data corresponds to a second articulatory feature;
   determine whether the first score exceeds a first threshold associated with at least one of a plurality of acoustic models;
   determine whether the second score exceeds a second threshold associated with at least one of the plurality of acoustic models;
   identify an acoustic model of a plurality of acoustic models, wherein the acoustic model is associated with the first articulatory feature and the second articulatory feature, and wherein the first score exceeds the first threshold and the second score exceeds the second threshold;
   compute, using the acoustic model, a feature vector score for the feature vector; and
   generate automatic speech recognition results based at least on the feature vector score, wherein the automatic speech recognition results comprise one or more transcriptions corresponding to the utterance.

2. The system of claim 1, wherein the first articulatory feature indicates one or more of whether a sound is a consonant or vowel, is voiced, is a fricative, is bilabial, or is labiodental.

3. The system of claim 1, wherein the acoustic model includes a first subset of a plurality of Gaussians and a second acoustic model includes a second subset of the plurality of Gaussians, wherein the first subset is different than the second subset, wherein the portion of the audio data comprises a frame, and wherein the feature vector comprises mel-frequency cepstral coefficient features, perceptual linear predictive features, or neural network features.

4. The system of claim 1, wherein the one or more processors are programmed to determine the first score by deriving a parameter from at least the portion of audio data, the parameter reflecting at least one of zero crossings, energy, auto-correlations, or linear-predictive coefficients.

5. A computer-implemented method comprising:
obtaining, by a spoken language processing system comprising one or more computing devices configured to execute specific instructions, audio data regarding an utterance;
determining, by the spoken language processing system, one or more articulatory features associated with a portion of the audio data;
identifying, by the spoken language processing system, a subset of a plurality of acoustic model components based at least on the one or more articulatory features;
computing a score, using the subset and by the spoken language processing system, for a feature vector for the portion of audio data; and
generating, by the spoken language processing system, automatic speech recognition results based at least on the score computed for the feature vector, wherein the automatic speech recognition results comprise one or more transcriptions corresponding to the utterance.

6. The computer-implemented method of claim 5, further comprising generating a feature vector for the portion, wherein the determining and the generating occur substantially in parallel.

7. The computer-implemented method of claim 5, wherein the acoustic model components comprise Gaussians.

8. The computer-implemented method of claim 7, wherein the subset of the plurality of Gaussians is identified based at least on a combination of two or more articulatory features.

9. The computer-implemented method of claim 8, wherein identifying the subset of the plurality of Gaussians comprises determining a score corresponding to the one or more articulatory features and determining that the score exceeds a threshold.

10. The computer-implemented method of claim 5, wherein identifying the subset of the plurality of acoustic model components comprises identifying a first acoustic model of a plurality of acoustic models and wherein the first acoustic model is associated with the one or more articulatory features.

11. The computer-implemented method of claim 10, wherein identifying the first acoustic model comprises identifying one of a linear discriminant analysis matrix associated with the one or more articulatory features or a semi-tied covariance matrix associated with the one or more articulatory features.

12. The computer-implemented method of claim 10, wherein the first acoustic model includes a first subset of the plurality of acoustic model components and a second acoustic model includes a second subset of the plurality of acoustic model components, and wherein the first subset is different than the second subset.

13. The computer-implemented method of claim 5, wherein the determining comprises determining a parameter from at least the portion of audio data, the parameter reflecting at least one of zero crossings, energy, auto-correlations, or linear-predictive coefficients.

14. The computer-implemented method of claim 5, wherein at least one of the one or more articulatory features indicates one or more of whether a sound is a consonant or vowel, is voiced, is a fricative, is bilabial, or is labiodental.

15. One or more non-transitory computer readable media comprising executable code that, when executed, cause one or more computing devices to perform a process comprising:
obtaining audio data regarding an utterance;
determining one or more articulatory features associated with a portion of the audio data;
identifying a subset of a plurality of acoustic model components based at least on the one or more articulatory features;
computing a score, using the subset, for a feature vector for the portion of audio data; and
generating automatic speech recognition results based at least on the score computed for the feature vector, wherein the automatic speech recognition results comprise one or more transcriptions corresponding to the utterance.

16. The one or more non-transitory computer readable media of claim 15, wherein at least one of the one or more articulatory features indicates one or more of whether a sound is a consonant or vowel, is voiced, is a fricative, is bilabial, or is labiodental.

17. The one or more non-transitory computer readable media of claim 15, wherein the process further comprises generating a feature vector for the portion, wherein the determining and the generating occur substantially in parallel.

18. The one or more non-transitory computer readable media of claim 15, wherein the acoustic model components comprise Gaussians.

19. The one or more non-transitory computer readable media of claim 18, wherein the subset of the plurality of Gaussians is identified based at least on a combination of two or more articulatory features.

20. The one or more non-transitory computer readable media of claim 19, wherein identifying the subset of the plurality of Gaussians comprises determining a score corresponding to the one or more articulatory features and determining that the score exceeds a threshold.

21. The one or more non-transitory computer readable media of claim 15, wherein identifying the subset of the plurality of acoustic model components comprises identifying a first acoustic model of a plurality of acoustic models and wherein the first acoustic model is associated with the one or more articulatory features.

22. The one or more non-transitory computer readable media of claim 21, wherein identifying the first acoustic model comprises identifying one of a linear discriminant analysis matrix associated with the one or more articulatory features or a semi-tied covariance matrix associated with the one or more articulatory features.

23. The one or more non-transitory computer readable media of claim 21, wherein the first acoustic model includes a first subset of the plurality of acoustic model components and a second acoustic model includes a second subset of the plurality of acoustic model components, and wherein the first subset is different than the second subset.

24. The one or more non-transitory computer readable media of claim 15, wherein the determining comprises determining a parameter from at least the portion of audio data, the parameter reflecting at least one of zero crossings, energy, auto-correlations, or linear-predictive coefficients.

* * * * *